US 9,748,551 B2

(12) United States Patent
Cain et al.

(10) Patent No.: US 9,748,551 B2
(45) Date of Patent: Aug. 29, 2017

(54) BATTERY PARTS HAVING RETAINING AND SEALING FEATURES AND ASSOCIATED METHODS OF MANUFACTURE AND USE

(75) Inventors: Tracy L. Cain, Forest Lake, MN (US); Michael Garin, White Bear Lake, MN (US)

(73) Assignee: Water Gremlin Company, White Bear Township, MN (US)

( * ) Notice: Subject to any disclaimer, the term of this patent is extended or adjusted under 35 U.S.C. 154(b) by 242 days.

(21) Appl. No.: 13/539,159

(22) Filed: Jun. 29, 2012

(65) Prior Publication Data

US 2013/0029213 A1 Jan. 31, 2013

Related U.S. Application Data

(60) Provisional application No. 61/502,641, filed on Jun. 29, 2011.

(51) Int. Cl.
*H01M 10/04* (2006.01)
*H01M 2/08* (2006.01)
*H01M 2/30* (2006.01)

(52) U.S. Cl.
CPC .......... *H01M 2/305* (2013.01); *Y10T 29/4911* (2015.01); *Y10T 29/49108* (2015.01)

(58) Field of Classification Search
CPC .............. H01M 2/305; Y10T 29/49108; Y10T 29/4911
See application file for complete search history.

(56) References Cited

U.S. PATENT DOCUMENTS

| 1,248,768 A | 12/1917 | Willard |
| 1,326,936 A | 1/1920 | Jeans et al. |
| 1,411,414 A | 4/1922 | Cook |

(Continued)

FOREIGN PATENT DOCUMENTS

| CA | 645083 | 7/1962 |
| CA | 2103759 | 3/1994 |

(Continued)

OTHER PUBLICATIONS

U.S. Appl. No. 11/709,365, filed Feb. 22, 2007, Ratte.

(Continued)

*Primary Examiner* — Emily Le
*Assistant Examiner* — Lilia V Nedialkova
(74) *Attorney, Agent, or Firm* — Perkins Coie LLP

(57) ABSTRACT

Battery parts, such as battery terminals, and associated systems and methods for making the same are disclosed herein. In one embodiment, a battery part has a base portion that includes one or more undercut sealing portions, each having a root and a lip. The lip can flare outwardly from the root to define an undercut between the root and the lip of the sealing portion. In some embodiments, the battery terminal can include adjacent sealing portions having opposing undercuts defined by overlapping lips of the adjacent sealing portions. Another embodiment includes a forming assembly for use with, for example, a battery part having a bifurcated acid ring with spaced apart lips. The forming assembly can include movable forming members that can be driven together to peen, crimp, flare or otherwise form the lips on the bifurcated acid ring.

35 Claims, 3 Drawing Sheets

(56) References Cited

U.S. PATENT DOCUMENTS

| | | |
|---|---|---|
| 1,947,158 A | 2/1934 | Henry |
| 1,982,801 A | 12/1934 | Gerking |
| 1,983,618 A | 12/1934 | Lamond |
| 2,100,333 A | 11/1937 | Hess |
| 2,194,092 A | 3/1940 | Lund et al. |
| 2,500,556 A | 3/1950 | Mallach |
| 2,510,100 A | 6/1950 | Goss |
| 2,599,706 A | 6/1952 | Friedman |
| 2,678,960 A | 5/1954 | Jensen |
| 2,901,527 A | 8/1959 | Mocas |
| 3,096,579 A | 7/1963 | Waller |
| 3,101,534 A | 8/1963 | Lange |
| 3,113,892 A | 12/1963 | Albrecht |
| 3,186,209 A | 6/1965 | Friedman |
| 3,280,613 A | 10/1966 | Schrom |
| 3,292,218 A | 12/1966 | Kozma, Jr. |
| 3,344,848 A | 10/1967 | Hall et al. |
| 3,381,515 A | 5/1968 | Orloff |
| 3,534,802 A | 10/1970 | Carr |
| 3,554,272 A | 1/1971 | Lauth |
| 3,709,459 A | 1/1973 | Bushrod |
| 3,736,642 A | 6/1973 | Miller et al. |
| 3,744,112 A | 7/1973 | Lindenberg |
| 3,793,086 A | 2/1974 | Badger |
| 3,808,663 A | 5/1974 | McLane |
| 3,835,686 A | 9/1974 | Lawson et al. |
| 3,842,646 A | 10/1974 | Kuhn |
| 3,945,097 A | 3/1976 | Daniels, Jr. et al. |
| 3,945,428 A | 3/1976 | Yanagisawa et al. |
| 3,947,936 A | 4/1976 | Wheadon |
| 3,992,759 A | 11/1976 | Farmer |
| 4,034,793 A | 7/1977 | Okura et al. |
| 4,049,040 A | 9/1977 | Lynch |
| 4,062,613 A | 12/1977 | Tritenne |
| 4,079,911 A | 3/1978 | Wirtz et al. |
| 4,083,478 A | 4/1978 | McLane |
| 4,100,674 A | 7/1978 | Tiegel |
| 4,146,771 A | 3/1979 | Tiegel |
| 4,160,309 A | 7/1979 | Scholle |
| 4,168,618 A | 9/1979 | Saier et al. |
| 4,177,551 A | 12/1979 | Johnson et al. |
| 4,212,934 A | 7/1980 | Salamon |
| 4,266,597 A | 5/1981 | Eberle |
| 4,284,122 A | 8/1981 | Oxenreider et al. |
| 4,291,568 A | 9/1981 | Stifano |
| 4,352,283 A | 10/1982 | Bailey |
| 4,362,043 A | 12/1982 | Hanson |
| 4,377,197 A | 3/1983 | Oxenreider et al. |
| 4,394,059 A | 7/1983 | Reynolds |
| 4,406,146 A | 9/1983 | Suzuki |
| 4,416,141 A | 11/1983 | Nippert |
| 4,422,236 A | 12/1983 | Ware, Jr. et al. |
| 4,423,617 A | 1/1984 | Nippert |
| 4,430,396 A | 2/1984 | Hayes, Jr. |
| 4,494,967 A | 1/1985 | Barth |
| 4,495,260 A | 1/1985 | Hardigg et al. |
| 4,497,359 A | 2/1985 | Suzuki et al. |
| 4,505,307 A | 3/1985 | Uchida |
| 4,574,005 A | 3/1986 | Cobbs, Jr. |
| 4,580,431 A | 4/1986 | Oku et al. |
| 4,592,405 A | 6/1986 | Allen |
| 4,610,581 A | 9/1986 | Heinlein |
| 4,614,630 A | 9/1986 | Pluim, Jr. |
| 4,662,205 A | 5/1987 | Ratte |
| 4,683,647 A | 8/1987 | Brecht et al. |
| 4,744,540 A | 5/1988 | Salamon et al. |
| 4,753,283 A | 6/1988 | Nakano |
| 4,775,604 A | 10/1988 | Dougherty et al. |
| 4,776,197 A | 10/1988 | Scott |
| 4,779,443 A | 10/1988 | Hoshi |
| 4,779,665 A | 10/1988 | Ouimet |
| 4,852,634 A | 8/1989 | Kawai et al. |
| 4,859,216 A | 8/1989 | Fritsch |
| 4,859,547 A | 8/1989 | Adams et al. |
| 4,874,032 A | 10/1989 | Hatamura |
| 4,879,191 A | 11/1989 | Sindorf |
| 4,938,276 A | 7/1990 | Noguchi et al. |
| 4,945,749 A | 8/1990 | Walker et al. |
| 4,967,827 A | 11/1990 | Campbell |
| 5,016,460 A | 5/1991 | England et al. |
| 5,048,590 A | 9/1991 | Carter |
| 5,072,772 A | 12/1991 | Haehne |
| 5,074,352 A | 12/1991 | Suzuki |
| 5,077,892 A | 1/1992 | Nugent |
| 5,108,668 A | 4/1992 | Kallup |
| 5,125,450 A | 6/1992 | Kidd et al. |
| 5,143,141 A | 9/1992 | Frulla |
| 5,146,974 A | 9/1992 | Mayer et al. |
| 5,170,835 A | 12/1992 | Eberle et al. |
| 5,180,643 A | 1/1993 | Nedbal |
| 5,244,033 A | 9/1993 | Ueno |
| 5,273,845 A | 12/1993 | McHenry et al. |
| 5,290,646 A | 3/1994 | Asao et al. |
| 5,296,317 A | 3/1994 | Ratte et al. |
| 5,316,505 A | 5/1994 | Kipp |
| 5,326,655 A | 7/1994 | Mix et al. |
| 5,343,927 A | 9/1994 | Ivansson |
| 5,349,840 A | 9/1994 | Ratte et al. |
| 5,373,720 A | 12/1994 | Ratte et al. |
| 5,380,603 A | 1/1995 | Hooke |
| 5,415,219 A | 5/1995 | Wiedenmann et al. |
| 5,422,202 A | 6/1995 | Spiegelberg et al. |
| 5,445,907 A | 8/1995 | Ito et al. |
| 5,458,032 A | 10/1995 | Spiegelberg |
| 5,499,449 A | 3/1996 | Carter et al. |
| 5,511,605 A | 4/1996 | Iwamoto |
| 5,580,685 A | 12/1996 | Schenk |
| 5,584,730 A | 12/1996 | Tabata |
| 5,595,511 A | 1/1997 | Okada |
| 5,606,887 A | 3/1997 | Spiegelberg et al. |
| 5,623,984 A | 4/1997 | Nozaki et al. |
| 5,632,173 A | 5/1997 | Spiegelberg et al. |
| 5,655,400 A | 8/1997 | Spiegelberg et al. |
| 5,660,946 A | 8/1997 | Kump et al. |
| 5,663,015 A | 9/1997 | Hooke et al. |
| 5,671,797 A | 9/1997 | Nozaki et al. |
| 5,672,442 A | 9/1997 | Burnett |
| 5,686,202 A | 11/1997 | Hooke et al. |
| 5,704,119 A | 1/1998 | Ratte et al. |
| 5,709,967 A | 1/1998 | Larsen |
| 5,725,043 A | 3/1998 | Schaefer et al. |
| 5,730,203 A | 3/1998 | Mogensen |
| 5,746,267 A | 5/1998 | Yun et al. |
| 5,752,562 A | 5/1998 | Sparks |
| 5,758,711 A | 6/1998 | Ratte |
| 5,778,962 A | 7/1998 | Garza-Ondarza et al. |
| 5,785,110 A | 7/1998 | Guergov |
| 5,791,183 A | 8/1998 | Spiegelberg et al. |
| 5,814,421 A | 9/1998 | Spiegelberg et al. |
| 5,836,372 A | 11/1998 | Kono |
| 5,862,853 A | 1/1999 | Eliat |
| 5,887,641 A | 3/1999 | Iwamoto et al. |
| 5,908,065 A | 6/1999 | Chadwick |
| 5,924,471 A | 7/1999 | Lund et al. |
| 6,001,506 A | 12/1999 | Timmons et al. |
| 6,030,723 A | 2/2000 | Nagano et al. |
| 6,033,801 A | 3/2000 | Casais |
| 6,082,937 A | 7/2000 | Ratte |
| 6,123,142 A | 9/2000 | Ratte |
| 6,152,785 A | 11/2000 | Haller et al. |
| 6,155,889 A | 12/2000 | Scarla et al. |
| 6,183,905 B1 | 2/2001 | Ling |
| 6,202,733 B1 | 3/2001 | Ratte |
| 6,255,617 B1 | 7/2001 | Farmer et al. |
| 6,258,481 B1 | 7/2001 | Ross et al. |
| 6,267,171 B1 | 7/2001 | Onuki et al. |
| 6,363,996 B1 | 4/2002 | Ratte |
| 6,405,786 B1 | 6/2002 | Ratte |
| 6,499,530 B2 | 12/2002 | Ratte |
| 6,513,570 B2 | 2/2003 | Ratte |
| 6,564,853 B1 | 5/2003 | Ratte |
| 6,598,658 B2 | 7/2003 | Ratte |
| 6,613,163 B1 | 9/2003 | Pfeifenbring et al. |
| 6,644,084 B1 | 11/2003 | Spiegelberg |

(56) References Cited

U.S. PATENT DOCUMENTS

| | | |
|---|---|---|
| 6,684,935 B2 | 2/2004 | Ratte |
| 6,701,998 B2 | 3/2004 | Ratte |
| 6,803,146 B2 | 10/2004 | Key et al. |
| 6,806,000 B2 | 10/2004 | Misra et al. |
| 6,830,490 B2 | 12/2004 | Murakami et al. |
| 6,864,015 B2 | 3/2005 | Peterson et al. |
| 6,866,087 B2 | 3/2005 | Ratte |
| 6,896,031 B2 | 5/2005 | Ratte |
| 6,902,095 B2 | 6/2005 | Ratte |
| 6,908,640 B2 | 6/2005 | Ratte et al. |
| 6,929,051 B2 | 8/2005 | Peterson et al. |
| 6,982,131 B1 | 1/2006 | Hamada et al. |
| 6,997,234 B2 | 2/2006 | Peterson |
| 7,021,101 B2 | 4/2006 | Spiegelberg |
| 7,070,441 B1* | 7/2006 | Gregory et al. ............. 439/404 |
| 7,074,516 B2 | 7/2006 | Davidson et al. |
| 7,163,763 B2 | 1/2007 | Spiegelberg et al. |
| 7,163,764 B2 | 1/2007 | Ratte |
| 7,246,650 B2 | 7/2007 | Peterson |
| 7,338,539 B2* | 3/2008 | Ratte et al. ................. 29/623.1 |
| 7,390,364 B2 | 6/2008 | Ratte et al. |
| 8,202,328 B2 | 6/2012 | Ratte et al. |
| 8,497,036 B2 | 7/2013 | Garin et al. |
| 8,512,891 B2 | 8/2013 | Ratte |
| 8,701,743 B2 | 4/2014 | Ratte et al. |
| 8,802,282 B2 | 8/2014 | Garin et al. |
| 9,034,508 B2 | 5/2015 | Ratte |
| 9,190,654 B2 | 11/2015 | Ratte et al. |
| 2001/0031394 A1 | 10/2001 | Hansen et al. |
| 2002/0002772 A1 | 1/2002 | Hirano et al. |
| 2002/0114994 A1 | 8/2002 | Yabuki et al. |
| 2003/0017391 A1 | 1/2003 | Peterson et al. |
| 2003/0017392 A1 | 1/2003 | Key et al. |
| 2003/0207172 A1 | 11/2003 | Misra et al. |
| 2003/0224248 A1 | 12/2003 | Spiegelberg et al. |
| 2004/0044071 A1 | 3/2004 | Fischer et al. |
| 2005/0042509 A1 | 2/2005 | Key et al. |
| 2005/0084751 A1 | 4/2005 | Ratte |
| 2005/0147881 A1 | 7/2005 | Ratte et al. |
| 2005/0147882 A1 | 7/2005 | Ratte et al. |
| 2005/0153202 A1 | 7/2005 | Ratte |
| 2005/0155737 A1 | 7/2005 | Ratte |
| 2005/0238955 A1 | 10/2005 | Hooke et al. |
| 2006/0068279 A1 | 3/2006 | Spiegelberg et al. |
| 2006/0127693 A1 | 6/2006 | Peslerbe et al. |
| 2006/0162417 A1 | 7/2006 | Spiegelberg et al. |
| 2008/0038633 A1 | 2/2008 | Ratte |
| 2009/0047574 A1 | 2/2009 | Hellmann |
| 2009/0229781 A1 | 9/2009 | Ratte |
| 2009/0246618 A1 | 10/2009 | Dirks |
| 2010/0033239 A1 | 2/2010 | Nakagawa et al. |
| 2010/0116455 A1 | 5/2010 | Ratte |
| 2010/0291435 A1 | 11/2010 | Garin et al. |
| 2011/0045336 A1 | 2/2011 | Ratte et al. |
| 2011/0174459 A1 | 7/2011 | Garin et al. |
| 2011/0250493 A1 | 10/2011 | Balzan et al. |
| 2011/0262806 A1 | 10/2011 | Balzan et al. |
| 2014/0083642 A1 | 3/2014 | Ratte |
| 2014/0201981 A1 | 7/2014 | Ratte et al. |
| 2014/0259646 A1 | 9/2014 | Cain |
| 2016/0126527 A1 | 5/2016 | Ratte et al. |
| 2016/0218346 A1 | 7/2016 | Garin et al. |

FOREIGN PATENT DOCUMENTS

| | | |
|---|---|---|
| CA | 2459031 | 3/1994 |
| CA | 2558525 | 4/2007 |
| CH | 321596 | 5/1957 |
| CH | 371154 | 8/1963 |
| DE | 523104 | 4/1931 |
| DE | 1146149 | 3/1963 |
| DE | 2645977 | 4/1978 |
| DE | 3230628 | 12/1983 |
| DE | 3401354 | 7/1985 |
| DE | 3502675 | 7/1986 |
| DE | 3942175 | 6/1991 |
| DE | 4127956 | 2/1993 |
| DE | 4241393 | 7/1994 |
| DE | 19635075 | 3/1998 |
| EP | 0040951 | 12/1981 |
| EP | 0117213 | 8/1984 |
| EP | 0244683 | 11/1987 |
| EP | 0261311 | 3/1988 |
| EP | 0319128 | 6/1989 |
| EP | 0344042 | 11/1989 |
| EP | 0448792 A2 | 10/1991 |
| EP | 0559920 | 9/1993 |
| EP | 0590284 | 4/1994 |
| EP | 0601268 | 6/1994 |
| EP | 0809327 | 11/1997 |
| EP | 0878856 | 11/1998 |
| EP | 1291940 | 3/2003 |
| EP | 1700354 A2 | 9/2006 |
| ES | 2097388 | 4/1997 |
| FR | 2504424 | 10/1982 |
| GB | 297904 | 10/1928 |
| GB | 386159 | 1/1933 |
| GB | 1236495 | 6/1971 |
| GB | 1245255 | 9/1971 |
| GB | 1257963 | 12/1971 |
| GB | 1352882 | 5/1974 |
| GB | 2141654 | 1/1985 |
| GB | 2315695 | 2/1998 |
| JP | 55057259 | 4/1980 |
| JP | 56159054 | 12/1981 |
| JP | 56165359 | 12/1981 |
| JP | 58209861 | 12/1983 |
| JP | 59029357 | 2/1984 |
| JP | 61008846 | 1/1986 |
| JP | 61096660 | 5/1986 |
| JP | 61189860 | 8/1986 |
| JP | 1124954 | 5/1989 |
| JP | 1239762 | 9/1989 |
| JP | 1243369 | 9/1989 |
| JP | 2155557 | 6/1990 |
| JP | 2234347 | 9/1990 |
| JP | 2247036 | 10/1990 |
| JP | 3049152 | 3/1991 |
| JP | 3263756 | 11/1991 |
| JP | 4135042 | 5/1992 |
| JP | 4206459 | 7/1992 |
| JP | 4223047 | 8/1992 |
| JP | 5283057 | 10/1993 |
| JP | 5315940 | 12/1993 |
| JP | 6015402 | 1/1994 |
| JP | 6020663 | 1/1994 |
| JP | 6196136 | 7/1994 |
| JP | 6223812 | 8/1994 |
| JP | 7211308 | 8/1995 |
| JP | 7211309 | 8/1995 |
| JP | 7235286 | 9/1995 |
| JP | 9045309 | 2/1997 |
| JP | 9130460 | 5/1997 |
| JP | 9167610 | 6/1997 |
| JP | 9237615 | 9/1997 |
| JP | 9312151 | 12/1997 |
| JP | 9320630 | 12/1997 |
| JP | 10116602 | 5/1998 |
| JP | 10144289 | 5/1998 |
| JP | 8171897 | 7/1998 |
| JP | 10208714 | 8/1998 |
| JP | 8273656 | 10/1998 |
| JP | 11045698 | 2/1999 |
| JP | 11045699 | 2/1999 |
| JP | 11135102 | 5/1999 |
| JP | 11176415 | 7/1999 |
| JP | 2000021367 | 1/2000 |
| JP | 2000164199 | 6/2000 |
| JP | 2001006655 | 1/2001 |
| JP | 2001307714 | 2/2001 |
| JP | 2001256955 | 9/2001 |
| JP | 2002025536 | 1/2002 |
| JP | 2002050327 | 2/2002 |
| JP | 2002175795 | 6/2002 |

(56) References Cited

FOREIGN PATENT DOCUMENTS

| | | |
|---|---|---|
| JP | 2002270150 | 9/2002 |
| JP | 2003007281 | 1/2003 |
| JP | 2003242946 | 8/2003 |
| JP | 2003317677 | 11/2003 |
| JP | 2003317698 | 11/2003 |
| JP | 2003346777 | 12/2003 |
| JP | 2003346778 | 12/2003 |
| JP | 2004039401 | 2/2004 |
| JP | 2004228013 | 8/2004 |
| JP | 2004228046 | 8/2004 |
| JP | 2004235050 | 8/2004 |
| JP | 2004281145 | 10/2004 |
| JP | 2005078856 | 3/2005 |
| JP | 2005116243 | 4/2005 |
| JP | 2005116387 | 4/2005 |
| JP | 2005142009 | 6/2005 |
| JP | 2006331784 | 12/2006 |
| JP | 2007157611 | 6/2007 |
| KR | 3044813 | 6/2003 |
| SU | 688279 | 9/1979 |
| WO | WO94/02272 | 2/1994 |
| WO | WO99/07029 | 2/1999 |
| WO | WO2005067513 | 7/2005 |
| WO | WO-2005119813 | 12/2005 |
| WO | WO2008032348 | 3/2008 |
| WO | WO2009142621 | 11/2009 |
| WO | WO-2009142621 | 11/2009 |
| WO | WO2010033239 | 3/2010 |
| WO | WO2010127289 | 11/2010 |

OTHER PUBLICATIONS

U.S. Appl. No. 12/029,447, filed Feb. 11, 2008, Ratte.
Colombian Examination Report; Colombian Patent Application No. 99065069; International Filing Date: Oct. 13, 1999; Applicant: Water Gremlin Company; Mailing Date: Mar. 4, 2009.
European Search Report; European Patent Application No. 03023874.5; Applicant: Water Gremlin Company; Mailing Date: Apr. 27, 2010.
European Search Report; European Patent Application No. 04816050.1; Applicant: Water Gremlin Company; Mailing Date: Mar. 3, 2009.
Examination Report; European Patent Application No. 04816050.1; Applicant: Water Gremlin Company; Mailing Date: Jul. 14, 2009.
Final Office Action, U.S. Appl. No. 11/011,362, Mailed on Aug. 31, 2009, 11 pages.
Final Office Action, U.S. Appl. No. 11/058,625, Mailed on Mar. 6, 2006, 5 pages.
Final Office Action, U.S. Appl. No. 11/058,625, Mailed on Jul. 5, 2006, 6 pages.
Final Office Action, U.S. Appl. No. 11/709,365, Mailed on Nov. 21, 2008, 9 pages.
Final Office Action; U.S. Appl. No. 12/771,714; Mailed on Nov. 29, 2012; 11 pages.
Gould Drawing No. 8RD5538, "Cold Forged Positive Lead Terminal Bushing for Plastic Covers", Gould Auto. Div., St. Paul, Minn., May 3, 1974. Best copy available.
Gould Drawing No. 8RD5539, "Cold Forged Negative Lead Terminal Bushing for Plastic Covers", Gould Auto. Div., St. Paul, Minn., May 3, 1974. Best copy available.
Heller, Machine translation of EP 0601268—May 1993, EPO, 2 pages.
HPM Corporation. HPM Tech Data-Thixomolding. Feb. 1992, 1 page, place of publication unknown.
HPM, Thixomolding. Utilizes Injection Molding . . . Date unknown, 2 page advertisement, place of publication unknown.
International Search Report and Written Opinion; International Patent Application No. PCT/US04/44071; Filed: Dec. 21, 2004; Applicant: Water Gremlin Company; Mailed on Dec. 22, 2005.
International Search Report and Written Opinion; International Patent Application No. PCT/US08/64161; Filed: May 19, 2008; Applicant: Ferrari, Paolo; Mailed on Aug. 15, 2008.
International Search Report and Written Opinion; International Patent Application No. PCT/US2010/033239; Filed: Apr. 4, 2010; Applicant: Water Gremlin Company; Mailed on Sep. 7, 2010.
International Search Report and Written Opinion; International Patent Application No. PCT/US2011/021571; Filed: Jan. 18, 2011; Applicant: Water Gremlin Company; Mailed on Mar. 21, 2011.
International Search Report and Written Opinion; International Patent Application No. PCT/US10/43973; Filed: Jul. 30, 2010; Applicant: Water Gremlin Company; Mailed on Dec. 16, 2010.
International Search Report and Written Opinion; International Patent Application No. PCT/US2011/028388 filed Mar. 14, 2011, Mailing Date: Jul. 26, 2011.
International Search Report and Written Opinion; International Patent Application No. PCT/US2011/028389 filed Mar. 14, 2011, Mailing Date: Aug. 25, 2011.
Lindberg Corporation. Hot Lines. Significant Developments from the Engineered Products Group: Equipment News. Date unknown, Issue 3, 3 pages, place of publication unknown. And cited on U.S. Pat. No. 5,758,711.
Lindberg Corporation. Hot Lines. Mar. 1993, vol. III, Issue 2, pp. 1-2, place of publication unknown. And cited on U.S. Pat. No. 5,758,711.
Lindberg Corporation. Press Release: Thixomolding Processes Establishes Production Benchmarks, 1993, 5 pages, Illinois.
Non-Final Office Action, U.S. Appl. No. 11/011,362, Mailed on Dec. 5, 2008, 7 pages.
Non-Final Office Action, U.S. Appl. No. 11/058,625, Mailed on Nov. 2, 2005, 5 pages.
Non-Final Office Action, U.S. Appl. No. 11/058,625, Mailed on Nov. 30, 2006, 4 pages.
Non-Final Office Action, U.S. Appl. No. 11/709,365, Mailed on Oct. 31, 2007, 5 pages.
Non-Final Office Action; U.S. Appl. No. 11/076,559; Mailed on Oct. 17, 2008, 6 pages.
Non-Final Office Action; U.S. Appl. No. 12/470,363; Mailed on Jul. 22, 2009, 10 pages.
Non-Final Office Action; U.S. Appl. No. 12/533,413; Mailed on Jun. 19, 2012, 10 pages.
Non-Final Office Action; U.S. Appl. No. 12/771,714; mailed Jun. 28, 2012.
Extended European Search Report; Application No. 08755902.7, mailed Nov. 27, 2012, 6 pages.
Non-Final Office Action; U.S. Appl. No. 12/533,413; mailed on Jan. 28, 2013, 13 pages.
Examination Report; European Patent Application No. 10196207.4, Applicant: Water Gremlin Company; mailed on Feb. 22, 2013.
Non-Final Office Action U.S. Appl. No. 13/046,649, mailed on Feb. 27, 2013, 35 pages.
Non-Final Office Action U.S. Appl. No. 13/046,643, mailed on Jul. 1, 2013, 22 pages.
Non-Final Office Action U.S. Appl. No. 13/008,673, mailed on Jul. 18, 2013, 44 pages.
Final Office Action; U.S. Appl. No. 13/046,643; Mailed on May 2, 2014; 10 pages.
Non-Final Office Action; U.S. Appl. No. 14/225,239; Mailed on Jul. 7, 2014; 6 pages.
Examination Report; European Patent Application No. 10196207.4, Applicant: Water Gremlin Company; Mailing Date: Jun. 27, 2014, 5 pages.
Non-Final Office Action; U.S. Appl. No. 13/971,674; Mailed on Jan. 3, 2014, 2014; 9 pages.
Final Office Action; U.S. Appl. No. 13/971,674; Mailed on Sep. 11, 2014; 7 pages.
Non-Final Office Action; U.S. Appl. No. 13/927,044; Mailed on Oct. 28, 2013; 12 pages.
European Search Report; European Patent Application No. 10196207; Applicant: Water Gremlin Company; Mailing Date: Feb. 28, 2011.
Extended European Search Report, Application No. 16163594.1, Water Gremlin Company, mailed Jun. 13, 2016, 6 pages.

(56) References Cited

OTHER PUBLICATIONS

Supplementary European Search Report for Application No. 10805130, mailed Jan. 23, 2017 from the European Patent Office, 8 pages.

* cited by examiner

BATTERY PARTS HAVING RETAINING AND SEALING FEATURES AND ASSOCIATED METHODS OF MANUFACTURE AND USE

CROSS-REFERENCE TO RELATED APPLICATION(S)

This application claims priority to U.S. Provisional Patent Application No. 61/502,641, filed Jun. 29, 2011 and entitled "BATTERY PARTS HAVING RETAINING AND SEALING FEATURES AND ASSOCIATED METHODS OF MANUFACTURE AND USE", which is incorporated herein in its entirety by reference.

TECHNICAL FIELD

The following disclosure relates generally to battery parts and, more particularly, to battery terminals, battery terminal bushings, and the like.

BACKGROUND

Battery terminals are typically cold formed or die cast from lead or lead alloys. In a conventional battery, the terminals protrude from a casing or container which carries electrolyte. The container is typically formed from a moldable thermoplastic resin, such as polypropylene. During manufacture of the container, the resin flows around the base of the terminals so that the resin will secure the terminals in place once it hardens. After a terminal has been secured, a lead anode can be inserted into a central hole in the terminal and melted to fill the hole and form a mechanical and electrical connection to a battery grid positioned within the container.

Battery terminals can include annular acid rings that extend around the base of the terminal to provide an extended interface between the base of the terminal and the adjacent container material. This interface can provide a tortuous path or "labyrinth seal" that inhibits or prevents electrolyte from escaping the battery container. Various types of terminal seals, and methods for making such seals are disclosed in U.S. Pat. Nos. 7,338,539 and 8,202,328, and U.S. patent application Ser. Nos. 11/011,362, and 12/533,413, now U.S. Pat. No. 8,701,743, all of which are incorporated into the present application in their entireties by reference. Conventional seals can be compromised if the container material shrinks during hardening or otherwise pulls away from the base of the terminal over time. There is accordingly a need for a battery terminal that can maintain an adequate seal with a battery container under extended use.

DETAILED DESCRIPTION

Figure 1A:
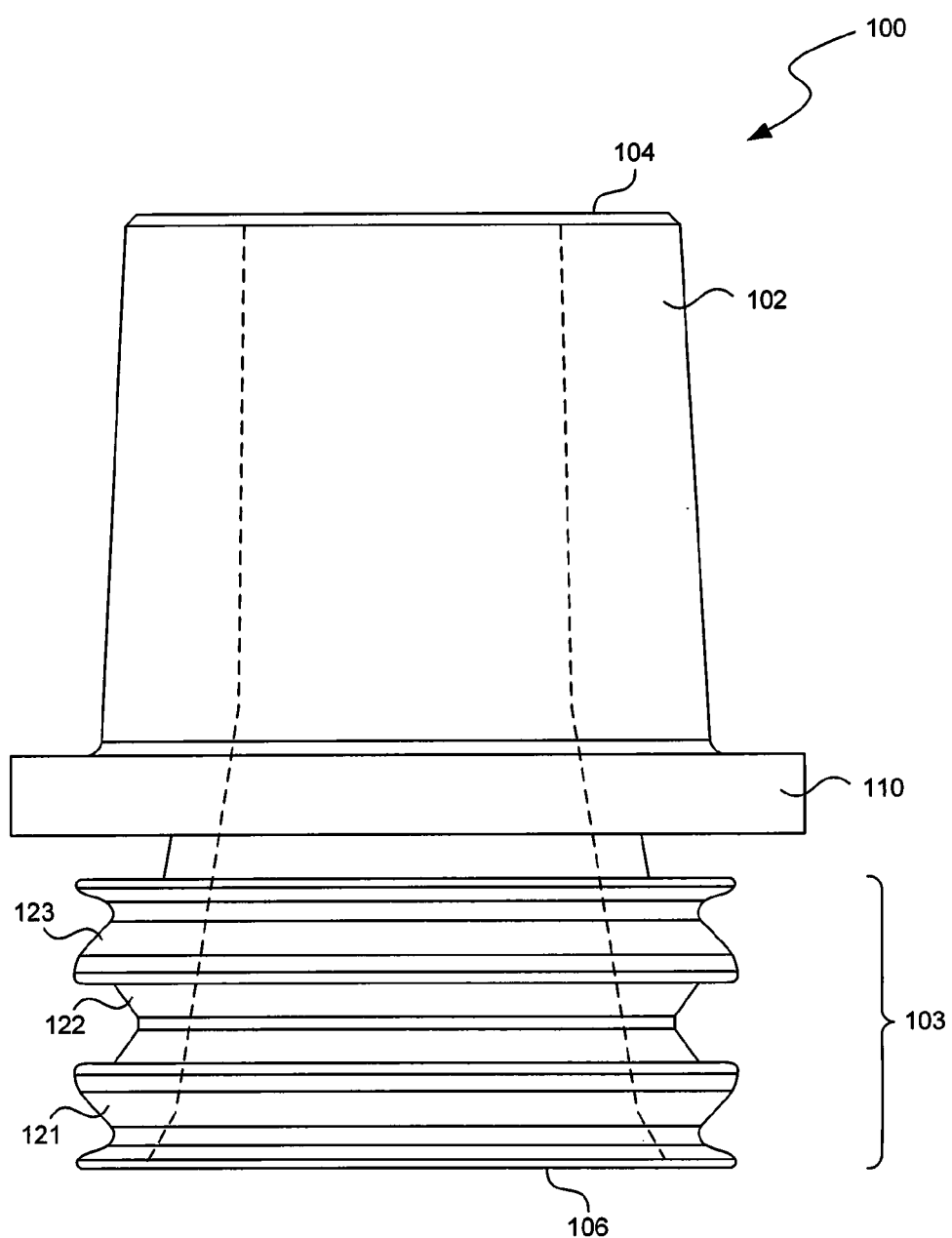
FIG. 1A is a front view and FIG. 1B is a cross-sectional front view of a battery part configured in accordance with an embodiment of the present disclosure.

The following disclosure describes various embodiments of battery parts, such as battery terminals or bushings and the like, and associated methods of manufacture and use. In one embodiment, the battery part includes several sealing portions that encircle a base portion of the battery part. Plastic material can be molded around the base portion to form a battery container that can contain electrolyte or other fluid. To prevent the battery fluid from leaking from the container, the sealing portions create an indirect, tortuous path. In some embodiments, the sealing portions have lips that flare outwardly from the base portion. The adjacent lips of adjacent sealing portions can overlap one another to prevent the molded plastic material from shrinking and pulling away from the battery part. The adjacent sealing portions can have different radial dimensions to avoid interference between adjacent lips.

In one embodiment, a battery terminal configured in accordance with the present disclosure includes a body having a base portion that is configured to be embedded in battery container material when the corresponding battery container is formed. The base portion can include undercut sealing portions, each having a root and a lip. The lip can flare outwardly from the root to define an undercut between the root and the lip of the sealing portion. In some embodiments, the battery terminal can include adjacent sealing portions having opposing undercuts defined by overlapping lips of the adjacent sealing portions.

In some embodiments, the present disclosure is directed to a battery part and methods of manufacturing such a part. The battery part can include a lug portion, a base portion, and a flange. The flange can extend radially from the battery part between the lug portion and the base portion. The battery part can also include a plurality of sealing portions extending generally radially outwardly from the base portion. The sealing portions can include lips that flare outwardly from the base portion, forming an undercut between the lip and the base portion. Moreover, a lip of one sealing portion can overlap a lip of an adjacent sealing portion, so that when viewed from the side, one lip appears to cover the other lip.

In some embodiments, the battery part can include a lug portion, a base portion, a first sealing portion extending radially outward from the base portion, and a second sealing portion extending radially outward from the base portion adjacent to the first sealing portion. The battery part can further include a first lip extending from the first sealing portion, and a second lip extending from the second sealing portion. The first lip flares outwardly toward the second sealing portion and overlaps at least a portion of the second lip with a space between the first lip and the second lip.

In further embodiments, the battery parts can include a first sealing portion extending from a base portion of the battery terminal and having a first root and a first lip, and a second sealing portion extending from the base portion adjacent the first sealing portion and having a second root and a second lip. The first root of the first sealing portion is spaced apart from the second root of the second sealing portion by a first distance, and the first lip of the first sealing portion is spaced apart from the second lip of the second sealing portion by a second distance that is less than the first distance. In this embodiment, the first and second lips can at least partially overlap with a small space between the lips.

Certain details are set forth in the following description and in FIGS. 1A-2 to provide a thorough understanding of various embodiments of the disclosure. Other details describing well-known structures and systems often associated with battery parts (e.g., lead and/or lead alloy battery parts, moldable battery containers, etc.), and methods for forming such parts (e.g., forming, casting, injection molding, etc.), as well as other battery parts and assemblies, are not set forth in the following disclosure to avoid unnecessarily obscuring the description of the various embodiments of the disclosure.

Many of the details, dimensions, angles and/or other portions shown in the Figures are merely illustrative of particular embodiments of the disclosure. Accordingly, other embodiments can have other details, dimensions, angles and/or portions without departing from the scope of the present disclosure. In addition, further embodiments of the disclosure may be practiced without several of the details described below, while still other embodiments of the disclosure may be practiced with additional details and/or portions.

In the Figures, identical reference numbers identify identical or at least generally similar elements. To facilitate the discussion of any particular element, the most significant digit or digits of any reference number refers to the Figure in which that element is first introduced. For example, element 110 is first introduced and discussed with reference to FIG. 1.

Figure 1B:
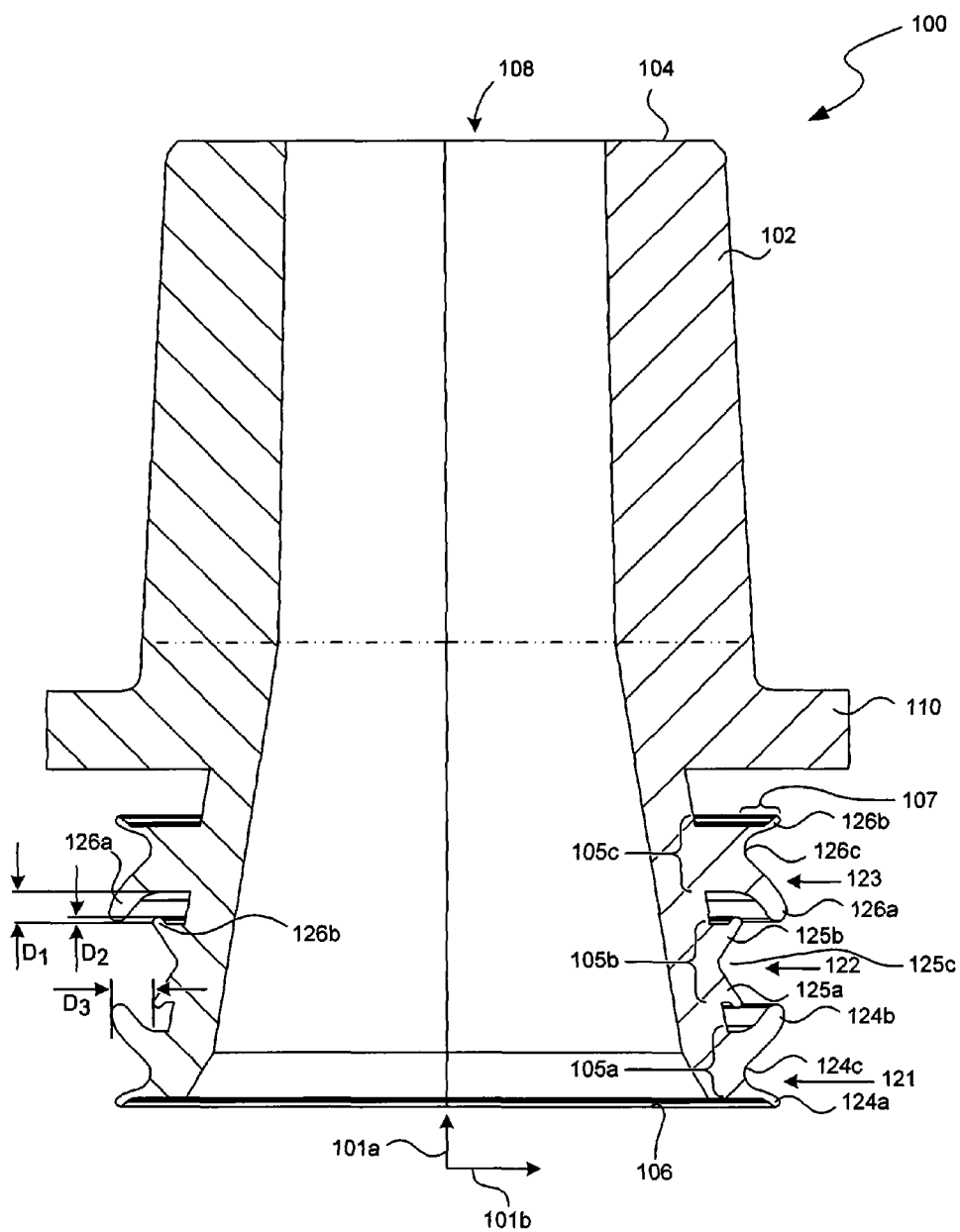

FIG. 1A is a front view and FIG. 1B is a cross-sectional front view of a battery part 100 configured in accordance with an embodiment of the disclosure. Referring to FIGS. 1A and 1B together, in the illustrated embodiment the battery part 100 is a battery terminal or terminal bushing. In other embodiments, the battery part 100 can be other parts (e.g., other lead parts) configured to seal plastic and other containers. The battery part 100 can be formed from lead, lead alloy, and/or other suitable materials by forming (e.g., cold-forming, cold-forming with a segmented mold, hot-forming, roll-forming, stamping, etc.), casting (e.g., die casting), forging, machining, and/or other suitable methods known in the art.

In one aspect of this embodiment, the battery part 100 includes a projecting portion or lug portion 102 that extends from a base portion 103. The battery part 100 can also include a passage or through-hole 108 extending through the battery part 100 from a first end portion 104 to a second end portion 106. In the illustrated embodiment, the battery part 100 is aligned with a longitudinal axis 101a and a transverse axis 101b. The present embodiment refers to axial dimensions extending generally parallel to the longitudinal axis 101a, and radial dimensions extending generally parallel to the transverse axis 101b (i.e., perpendicular to the axis 101a). Terms such as upward, downward, inward, and outward may be used herein to refer to components of the battery part 100 as depicted in the Figures, although in use the battery part 100 may be oriented in any suitable direction.

The battery part 100 can include a flange 110 at an approximate midpoint of the battery part 100 near the base of the lug portion 102. The base portion 103 can include a plurality of sealing portions that extend generally radially outward from the base portion 103. In some embodiments, for example, the base portion 103 can include three sealing portions: a first sealing portion 121, a second sealing portion 122, and a third sealing portion 123. More or fewer than three sealing portions 121-123 can be used in other embodiments. Each of the sealing portions 121-123 can include similar features. For example, the first sealing portion 121 can have a root 105a, a first lip 124a, a second lip 124b, and a recess 124c between the first lip 124a and the second lip 124b. The second sealing portion 122 can similarly have a root 105b, a first lip 125a, a second lip 125b, and a recess 125c. The third sealing portion 123 can also have a root 105c, a first lip 126a, a second lip 126b, and a recess 126c. As described in more detail below, a battery container (shown in FIG. 2) can be formed around the sealing portions 121-123, and at least a portion of the flange 110. The profile of the sealing portions 121-123 forms a tortuous path that prevents fluids from leaking from the battery container between the battery part 100 and the container and restrains the container material from pulling away from the battery part 100 during formation and in use.

In some embodiments, the first lip 126a of the third sealing portion 123 can extend axially downwardly from a sidewall of the root 105c by a distance $D_1$. The second lip 125b of the second sealing portion 122 can extend axially upwardly from a sidewall of the root 105b, and can reach beyond the lower extent of the first lip 126a of the third sealing portion 123 by an overlap distance $D_2$. In the illustrated embodiment, the overlap distance D2 defines the axial overlap between adjacent lips of adjacent sealing portions. To accommodate this overlap, adjacent sealing portions can be radially offset, for example by a distance $D_3$.

In some embodiments, the third sealing portion 123 and the first sealing portion 121 can have substantially similar dimensions, but the third sealing portion 123 can be inverted relative to the first sealing portion 121. For example, as shown in FIG. 1B, the first lip 126a is generally similar to the second lip 124b of the first sealing portion 121. The second lip 126b can be generally similar to the first lip 124a of the first sealing portion 121. In some embodiments, the second sealing portion 122 is symmetrical about a transverse center plane, and the first lip 125a can be substantially similar to the second lip 125b.

In some embodiments, the lips of the adjacent sealing portions 121-123 can overlap to define a double-undercut. For example, the second lip 124b of the first sealing portion 121 extends upward to reach an axial position that is higher than the tip of the first lip 125a of the second sealing portion 122 (the lowest point on the first lip 125a). To avoid interference between the lips 125a and 124b, the second sealing portion 122 can be radially offset from the first sealing portion 121 and the third sealing portion 123. Each pair of adjacent sealing portions can have this double-undercut feature. In the embodiments shown in FIGS. 1 and 2, the first sealing portion 121 and the second sealing portion 122 have a double-undercut between them, and the second sealing portion 122 and the third sealing portion 123 have a double undercut between them. FIG. 1 illustrates this overlapping feature.

In some embodiments, the axial overlap between adjacent lips can be from about 0.006 to 0.010 inch, or about 0.008 inch, and the radial overlap can be from about 0.1 inch to about 0.025 inch, or about 0.03 inch. Other dimensions are possible and can be varied depending on circumstances and design choices. The overlap between adjacent lips of adjacent sealing portions 121-123 creates a tortuous path that inhibits leakage of a fluid out from the battery container. The battery container can be made of a plastic material which is molded around the sealing portions 121-123 in a suitable manner known in the art. During formation and even during use, the plastic of the battery container may tend to pull away from the base portion 103. The double-undercut feature can resist this tendency because the plastic of the container that fills the undercut region is trapped between the adjacent lips of the adjacent sealing portions 121-123. This further inhibits leakage from the battery container through the interface between the battery part 100 and the battery container.

The sealing portions 121-123 can be formed in a variety of suitable methods. In one embodiment, the sealing portions are formed (e.g., cast or molded) with the lips extending radially outwardly from the base portion 103 and are pressed between two or more convex or flat surfaces that press against the lips and a portion of the recesses of the sealing portions 121-123 and bend the lips upwardly and downwardly away from the recesses, giving the flared shape shown in FIGS. 1A and 1B. In other embodiments, the battery part 100 and the sealing portions can be rolled against a stationary or rolling die which can form the root and the lips of the sealing portions to have the overlapping characteristic as well. Several other techniques can be used to create the sealing portions 121-123. For example, many suitable techniques are described in U.S. Pat. No. 7,338,539, which is incorporated herein by reference in its entirety.

Figure 2:
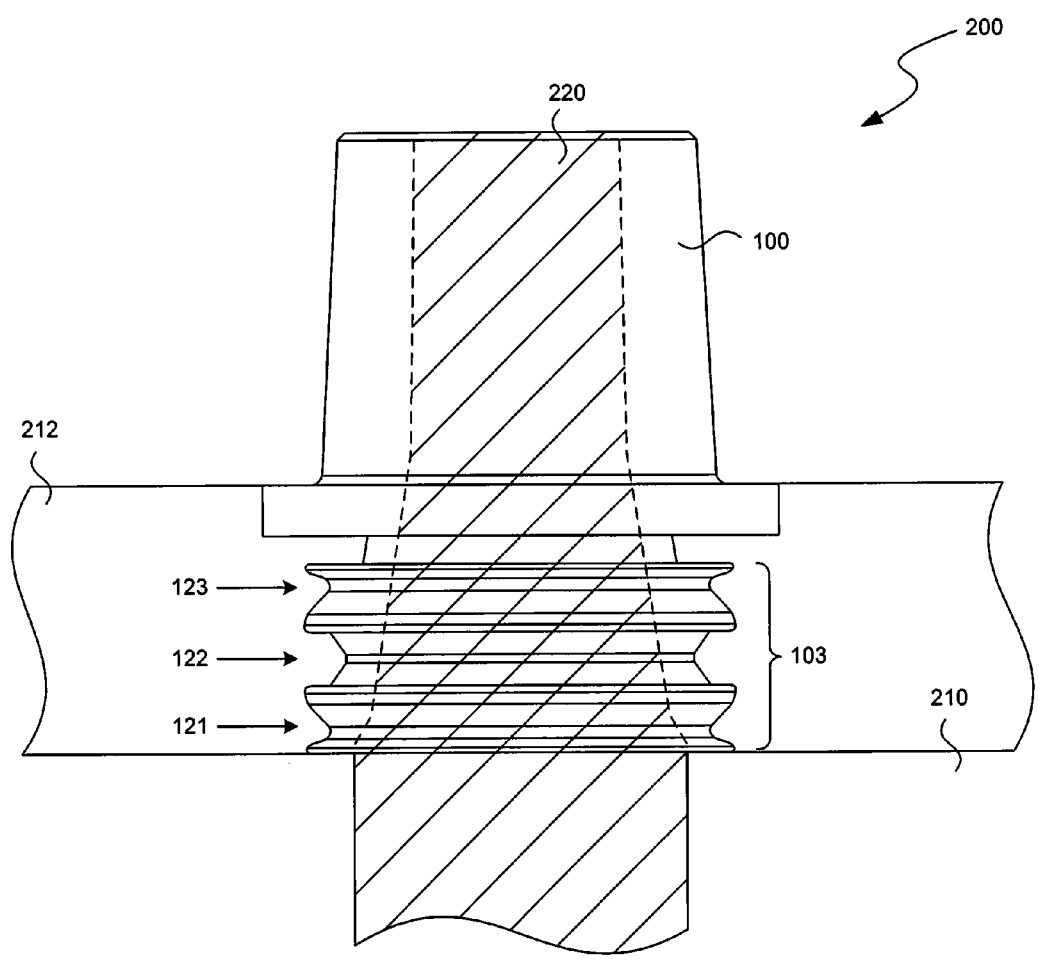
FIG. 2 is a front view of a battery assembly including a battery part configured in accordance with an embodiment of the present disclosure.

FIG. 2 is a cross-sectional view of a battery assembly 200 including the battery part 100 of FIGS. 1A and 1B configured in accordance with an embodiment of the present disclosure. The assembly 200 includes the battery part 100 attached to a battery casing or container 210 so that the lug portion 102 is exposed and accessible. The battery container 210 can be formed from a moldable material 212, such as polypropylene, polyethylene, other plastics, thermoplastic resins, and/or other suitable materials known in the art. During manufacture of the battery assembly 200, molten container material 212 can be flowed around the base portion 103 and sealing portions 121-123 of the battery part 100 so that the flange 110 is at least partially embedded in the container material 212, and the sealing portions 121-123 are embedded within the container material 212. The container material 212 flows between adjacent lips of adjacent sealing portions 121-123 as described above to fill the double-undercut regions and create a seal that can prevent or at least inhibit liquid (e.g., electrolyte, acid, water, etc.) from escaping the battery container 210 even if the container material shrinks.

The battery assembly 200 can also include a lead anode or conductor 220 that is mechanically and electrically connected to the battery part 100. More specifically, the conductor 220 fills the through-hole 108 and can be connected to a battery grid (not shown) positioned within the battery container 210. More details of the connection mechanism between the conductor 220, battery part 100, and battery grid are given in U.S. patent application Ser. No. 12/771,714, which is also incorporated herein by reference in its entirety.

From the foregoing, it will be appreciated that specific embodiments of the disclosure have been described herein for purposes of illustration, but that various modifications may be made without deviating from the spirit and scope of the various embodiments of the disclosure. For example, although many of the Figures described above illustrate battery parts having cylindrical portions (e.g., cylindrical lug portions, base portions, through-holes, etc.), in other battery parts configured in accordance with the present disclosure these portions can have one or more flat sides and/or other non-cylindrical surfaces. Further, while various advantages associated with certain embodiments of the disclosure have been described above in the context of those embodiments, other embodiments may also exhibit such advantages, and not all embodiments need necessarily exhibit such advantages to fall within the scope of the disclosure. Accordingly, the disclosure is not limited, except as by the appended claims.

The invention claimed is:

1. A battery part comprising:
a base portion configured to be at least partially embedded in battery container material; and
a plurality of sealing portions extending generally outwardly from the base portion, wherein the plurality of sealing portions include a first sealing portion axially spaced apart from a second sealing portion, wherein the first sealing portion includes at least a first lip that flares outwardly from the base portion and projects toward a first direction, wherein the second sealing portion includes at least a second lip that flares outwardly from the base portion and projects toward a second direction, opposite to the first direction, wherein the first lip includes a first tip and the second lip includes a second tip, and wherein the first tip is radially offset from the second tip and axially offset from the second tip so that the first lip axially overlaps the second lip.

2. The battery part of claim 1 wherein the first lip extends outwardly from the base portion a first distance, and wherein the second lip extends outwardly from the base portion a second distance, less than the first distance.

3. The battery part of claim 1 wherein the second lip is inverted relative to the first lip.

4. The battery part of claim 1 wherein the battery part is made from lead or a lead alloy.

5. The battery part of claim 1, further comprising:
a lug portion extending from the base portion, wherein a central bore extends through the lug portion and the base portion, and wherein the central bore is configured to receive a battery conductor.

6. The battery part of claim 1 wherein the first and second sealing portions extend completely around the base portion.

7. The battery part of claim 1 wherein the first lip extends completely around the base portion in a first circle, and wherein the second lip extends completely around the base portion in a second circle.

8. A battery part comprising:
a base portion configured to be at least partially embedded in battery container material; and
a plurality of sealing portions extending generally outwardly from the base portion, wherein the battery part defines a longitudinal axis, and wherein the plurality of sealing portions includes a first sealing portion adjacent to a second sealing portion, wherein the first sealing portion includes a first lip that flares outwardly from the base portion and has a first tip, wherein the second sealing portion includes a second lip that flares outwardly from the base portion and has a second tip, wherein the first tip is offset from the second tip in a first direction parallel to the longitudinal axis and in a second direction perpendicular to the longitudinal axis, and wherein the first lip overlaps the second lip in the first direction.

9. The battery part of claim 8, further comprising:
a lug portion extending from the base portion, wherein a central bore extends through the lug portion and the base portion, and wherein the central bore is configured to receive a battery conductor.

10. The battery part of claim 8 wherein the first and second tips extend completely around the base portion.

11. A battery part comprising:
a base portion configured to be at least partially embedded in a battery container material;
a first sealing portion extending radially outwardly from the base portion, the first sealing portion having a first lip portion flaring outwardly from a first root toward a first direction to define a first undercut therebetween, the first lip portion having a first tip; and
a second sealing portion extending radially outwardly from the base portion, wherein the second sealing portion is axially spaced apart from the first sealing portion, wherein the second sealing portion includes a second lip portion flaring outwardly from a second root toward a second direction, opposite to the first direction, to define a second undercut therebetween, and wherein the second lip portion has a second tip that is radially and axially offset from the first tip so that the first lip portion axially overlaps the second lip portion.

12. The battery part of claim 11 wherein the first lip portion flares outwardly from a first sidewall of the first root, wherein the first sealing portion further includes a third lip portion flaring outwardly from a second sidewall of the first root, opposite to the first sidewall, and wherein the third lip portion is asymmetrical relative to the first lip portion.

13. The battery part of claim 11, further comprising a third sealing portion inverted relative to the first sealing portion, wherein the second sealing portion is positioned between the first and third sealing portions, and wherein the second sealing portion is radially offset relative to the first and the third sealing portions.

14. The battery part of claim 11 wherein the first lip portion extends radially outward from the base portion a first distance, and wherein the second lip portion extends radially outward from the base portion a second distance, less than the first distance.

15. A battery part comprising:
a base portion configured to be at least partially embedded in a battery container material;
a first sealing portion extending radially outwardly from the base portion, wherein the first sealing portion includes a first lip portion flaring outwardly from a first root portion toward a first direction to define a first undercut therebetween, the first lip portion having a first tip;
a second sealing portion extending radially outwardly from the base portion, wherein the second sealing portion includes a second lip portion flaring outwardly from a second root portion to define a second undercut therebetween; and
a third sealing portion extending radially outwardly from the base portion, wherein the third sealing portion is axially disposed between the first sealing portion and the second sealing portion, wherein the third sealing portion includes a third lip portion flaring outwardly from a third root portion toward a second direction, opposite to the first direction, wherein the third lip portion has a second tip that is radially and axially offset from the first tip, and wherein the first lip portion axially overlaps the third lip portion.

16. The battery part of claim 15 wherein the third sealing portion is radially offset relative to the first and second sealing portions.

17. The battery part of claim 15 wherein the second sealing portion is inverted relative to the first sealing portion.

18. The battery part of claim 15, further comprising a fourth lip portion extending from the third root portion, wherein the second lip portion axially overlaps the fourth lip portion.

19. The battery part of claim 18 wherein the third lip portion and the fourth lip portion define a recess therebetween.

20. The battery part of claim 18 wherein the third sealing portion includes a first sidewall and a second sidewall, wherein the first sidewall and the third lip portion define a third undercut therebetween, and wherein the second sidewall and the fourth lip portion define a fourth undercut therebetween.

21. The battery part of claim 18 wherein the first lip portion is axially spaced apart from the third lip portion and wherein the second lip portion is axially spaced apart from the fourth lip portion.

22. The battery part of claim 18 wherein the second lip portion has a third tip and the fourth lip portion has a fourth tip, and wherein a first axial distance between the first and third tips is less than a second axial distance between the second and fourth tips.

23. The battery part of claim 22 wherein the third tip is radially offset from the fourth tip.

24. The battery part of claim 18 wherein the fourth lip portion projects in the first direction and the second lip portion projects in the second direction.

25. The battery part of claim 15 wherein the first lip portion radially overlaps the third lip portion.

26. The battery part of claim 15, further comprising a fourth lip portion flaring outwardly from the third root portion, wherein the second lip portion axially and radially overlaps the fourth lip portion.

27. The battery part of claim 15 wherein the first undercut has a first radial length between the base portion and the first lip portion, and wherein the third lip portion defines a third undercut has having a second radial length, less than the first radial length, between the base portion and the third lip portion.

28. A battery part comprising:
a base portion configured to be at least partially embedded in battery container material;
a first acid ring extending generally outward from the base portion, wherein the first acid ring includes a first root portion and a first lip portion flaring outwardly from the first root portion in a first axial direction, the first lip portion having a first tip; and
a second acid ring extending generally outward from the base portion, wherein the second acid ring is axially spaced apart from the first acid ring in the first axial direction, wherein the second acid ring includes a second root portion and a second lip portion flaring outwardly from the second root portion in a second axial direction, opposite the first axial direction, wherein the second lip portion has a second tip, wherein the first tip is axially and radially offset relative to the second tip, and wherein the first lip portion axially overlaps the second lip portion.

29. The battery part of claim 28 wherein the first lip portion has a first extent and the second lip portion has a second extent, and wherein the first extent is spaced apart from the second extent in the first axial direction.

30. The battery part of claim 28 wherein the first tip is axially spaced apart from the second tip by an overlap distance ranging from about 0.006 inch to about 0.010 inch.

31. The battery part of claim 28 wherein the second lip portion is inverted relative to the first lip portion.

32. The battery part of claim 28 wherein the first lip portion is positioned radially outward from the first root portion, and the second lip portion is positioned radially outward from the second root portion.

33. The battery part of claim 28, further comprising a third acid ring axially spaced apart from the second acid ring, wherein the second acid ring is axially positioned between the first and third acid rings.

34. The battery part of claim 33 wherein the third acid ring is radially offset relative to the second acid ring.

35. The battery part of claim 28 wherein the first acid ring further includes a third lip portion flaring outwardly from the first root portion in the second axial direction, wherein the first lip portion has a first size and the third lip portion has a second size, different than the first size.

* * * * *